(12) United States Patent
Han et al.

(10) Patent No.: US 8,630,345 B2
(45) Date of Patent: Jan. 14, 2014

(54) METHOD AND APPARATUS FOR VIDEO INTERPREDICTION ENCODING /DECODING

(75) Inventors: Woo-jin Han, Suwon-si (KR); Jeong-hoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1261 days.

(21) Appl. No.: 11/936,382

(22) Filed: Nov. 7, 2007

(65) Prior Publication Data

US 2008/0107178 A1    May 8, 2008

Related U.S. Application Data

(60) Provisional application No. 60/857,112, filed on Nov. 7, 2006.

(30) Foreign Application Priority Data

Mar. 7, 2007  (KR) .................. 10-2007-0022583

(51) Int. Cl.
  *H04N 11/04*  (2006.01)
(52) U.S. Cl.
  USPC .................................... 375/240.13
(58) Field of Classification Search
  None
  See application file for complete search history.

(56) References Cited

U.S. PATENT DOCUMENTS

| | | | |
|---|---|---|---|
| 6,819,714 B2* | 11/2004 | Yamada et al. | 375/240.12 |
| 6,920,178 B1* | 7/2005 | Curet et al. | 375/240.14 |
| 7,532,764 B2* | 5/2009 | Lee et al. | 382/238 |
| 7,830,960 B2* | 11/2010 | Liang et al. | 375/240.12 |
| 7,924,925 B2* | 4/2011 | He | 375/240.24 |
| 7,929,608 B2* | 4/2011 | Krishnan | 375/240.13 |
| 2005/0069211 A1* | 3/2005 | Lee et al. | 382/239 |
| 2005/0169371 A1* | 8/2005 | Lee et al. | 375/240.03 |
| 2005/0249291 A1* | 11/2005 | Gordon et al. | 375/240.18 |
| 2006/0104360 A1* | 5/2006 | Gordon | 375/240.16 |
| 2006/0215759 A1* | 9/2006 | Mori | 375/240.16 |
| 2006/0268984 A1* | 11/2006 | Kim et al. | 375/240.12 |
| 2007/0047656 A1* | 3/2007 | Kim et al. | 375/240.24 |
| 2007/0071087 A1* | 3/2007 | Kim et al. | 375/240.1 |
| 2007/0081591 A1* | 4/2007 | Ahn | 375/240.14 |
| 2007/0098067 A1* | 5/2007 | Kim et al. | 375/240.08 |
| 2007/0104268 A1* | 5/2007 | Seok et al. | 375/240.2 |
| 2007/0160136 A1* | 7/2007 | Lee et al. | 375/240.1 |
| 2008/0056364 A1* | 3/2008 | Lyashevsky et al. | 375/240.13 |
| 2008/0152313 A1* | 6/2008 | Sakurai et al. | 386/109 |

FOREIGN PATENT DOCUMENTS

| | | |
|---|---|---|
| CN | 1843037 A | 10/2006 |
| JP | 08195955 A | 7/1996 |
| JP | 10276439 A | 10/1998 |
| JP | 2000244929 A | 9/2000 |
| JP | 2002185970 A | 6/2002 |
| WO | 2005022920 A1 | 3/2005 |

OTHER PUBLICATIONS

Chinese Office Action dated Jul. 19, 2010, issued in counterpart application No. 200780049197.6.

(Continued)

*Primary Examiner* — Gregory Sefcheck
(74) *Attorney, Agent, or Firm* — Sughrue Mion, PLLC

(57) ABSTRACT

Provided is are method and apparatus for video interprediction encoding/decoding. The method of video interprediction encoding/decoding includes extracting intraprediction-encoded/decoded blocks included in previously encoded/decoded pictures and predicting a current block from the extracted blocks. Thus, video encoding/decoding can be performed using both an intra (I) picture and correlation with adjacent pictures, thereby increasing the speed of video encoding/decoding.

9 Claims, 8 Drawing Sheets

(56) References Cited

OTHER PUBLICATIONS

Communication, dated Jan. 29, 2012, issued by the State Intellectual Property Office of P.R. China in corresponding Chinese Application No. 200780049197.6.
Communication dated May 14, 2013 issued by the Korean Intellectual Property Office in counterpart Korean Patent Application No. 10-2007-0022583.
Communication dated Nov. 30, 2012 issued by the Intellectual Property Office of P.R. China in counterpart Chinese Patent Application No. 200780049197.6.
Communication dated Jun. 20, 2012 issued by the State Intellectual Property Office of P.R. China in counterpart Chinese Patent Application No. 200780049197.6.

* cited by examiner

METHOD AND APPARATUS FOR VIDEO INTERPREDICTION ENCODING /DECODING

CROSS-REFERENCE TO RELATED PATENT APPLICATION

This application claims priority from Korean Patent Application No. 10-2007-0022583, filed on Mar. 7, 2007, in the Korean Intellectual Property Office, and from U.S. Provisional Patent Application No. 60/857,112, filed on Nov. 7, 2006, in the U.S. Patent and Trademark Office, the disclosures of which are incorporated herein in their entirety by reference.

BACKGROUND OF THE INVENTION

1. Field of the Invention

Methods and apparatuses consistent with the present invention relate to video interprediction encoding/decoding, and more particularly, to video encoding/decoding for rapidly performing interprediction on a current predictive picture or slice.

2. Description of the Related Art

In video compression techniques such as moving picture experts group (MPEG)-1, MPEG-2, or MPEG-4 H.264/MPEG-4 advanced video coding (AVC), video coding is performed using three types of pictures, i.e., an intra (I) picture, a predictive (P) picture, and a bi-predictive (B) picture.

The I picture is obtained by independent intra-coding within a picture without referencing to pictures that precede or follow the picture. For the I picture, time-axis motion estimation for removing temporal redundancy is not used and encoding is performed only using information obtained within the picture.

The P picture is obtained by forward interprediction encoding between pictures. In other words, encoding is performed by prediction between pictures using an I picture or a P picture as a prediction picture. At this time, prediction with respect to the current block included in the current picture is performed using only a temporally past picture.

The B picture is obtained by bidirectional interprediction encoding between a plurality of pictures. In other words, encoding is performed by prediction between pictures using temporally past and future pictures as prediction pictures. The B picture is different from the P picture in that encoding is performed using both a past picture and a future picture.

FIG. 1A illustrates interprediction with respect to a P picture according to the prior art.

Referring to FIG. 1A, for interprediction with respect to a current block 117 included in a current picture 113, a temporally past picture is used. For example, in FIG. 1A, a block 116 that is most similar to the current block 117 is searched for in a P picture 112 that immediately precedes the current picture 113 and the found block 116 is used as a prediction value of the current block 117. Only a residue, that is, a difference between the current block 117 and the prediction block 116, is encoded, thereby improving the compression rate of encoding.

Video encoding can be performed with the removal of temporal redundancy by consecutively generating P pictures for a single I picture. All pictures 111 through 115 between two I pictures are referred to as a group of pictures (GOP), and a single GOP is composed of 15 pictures according to the H.264 standard.

FIG. 1B illustrates interprediction with respect to a B picture according to the prior art.

Referring to FIG. 1B, a temporally past picture 122 and a temporally future picture 124 are used to predict a current block 127 included in a current picture 123 among pictures 121 through 125 included in a single GOP. The B picture is different from the P picture in that the current block 127 is predicted using blocks 126 and 128 included in a plurality of pictures.

As illustrated in FIGS. 1A and 1B, in order to predict the current block 117 or 127 using temporally adjacent pictures, the temporally adjacent pictures have to have already been decoded, as will now be described in detail with reference to FIG. 1C.

FIG. 1C illustrates interprediction with respect to a P picture according to the prior art.

Referring to FIG. 1C, in order to decode a current block 140 included in a current picture 135, remaining pictures 131 through 134 of a GOP, except for the current picture 135, have to be decoded. Since the current block 140 should be predicted by repetitive prediction using a block 136 included in the I picture 131, all pictures preceding the current picture 135 have to be decoded in order to decode the current block 140, causing inefficiency.

Such inefficiency does not become an issue if pictures are sequentially reconstructed and reproduced. This is because a next picture can be predicted by sequential decoding and reproduction. However, when the current picture 135 is reconstructed without reconstruction with respect to the previous pictures 131 through 134 illustrated in FIG. 1C, the inefficiency constitutes a problem. For example, when a user desires to start playback from a specific scene, pictures included in a GOP are not sequentially accessed and random access may be made to a particular picture of the GOP.

The inefficiency can be solved by predicting all the P pictures 132 through 135 included in the GOP directly from the I picture 131. This is because, for any P picture of the GOP, only the I picture is reconstructed and the current picture is predicted from the reconstructed I picture, and the current picture is then reconstructed.

However, such a solution may degrade the compression rate of encoding with respect to the current picture 135 because other blocks of the current picture 135 are not properly predicted from the I picture. For example, if a new image object that does not exist in the I picture appears in the picture 134 that immediately precedes the current picture 135 and in the current picture 135, the current picture 135 cannot use correlation with its immediately previous picture 134, resulting in degradation of compression rate.

SUMMARY OF THE INVENTION

The present invention provides a method and apparatus for video interprediction encoding/decoding, in which prediction with respect to the current block can be rapidly performed.

The present invention also provides a computer-readable recording medium having recorded thereon a program for implementing the method.

According to one aspect of the present invention, there is provided a method of video interprediction encoding. The method includes extracting intraprediction-encoded blocks included in previously encoded pictures, predicting a current block from the extracted blocks, and encoding the current block based on the prediction.

The previously encoded pictures may be included in a group of pictures (GOP) including a current picture that includes the current block.

The extraction may comprise extracting N blocks having low compression rates of encoding from among the intraprediction-encoded blocks included in the previously encoded pictures.

According to another aspect of the present invention, there is provided an apparatus for video interprediction encoding. The apparatus includes an extraction unit extracting intraprediction-encoded blocks included in previously encoded pictures, a prediction unit predicting a current block from the extracted blocks, and an encoding unit encoding the current block based on the prediction.

The prediction unit may predict the current block from the extracted blocks and an intra (I) picture included in the GOP.

The extraction unit may extract N blocks having low compression rates of encoding from among the intraprediction-encoded blocks included in the previously encoded pictures.

According to another aspect of the present invention, there is provided a method of video interprediction decoding. The method includes extracting intraprediction-decoded blocks included in previously decoded pictures, predicting a current block from the extracted blocks, and reconstructing the current block based on the prediction.

According to another aspect of the present invention, there is provided an apparatus for video interprediction decoding. The apparatus includes an extraction unit extracting intraprediction-decoded blocks included in previously decoded pictures, a prediction unit predicting a current block from the extracted blocks, and a reconstruction unit reconstructing the current block based on the prediction.

According to another aspect of the present invention, there is provided a computer-readable recording medium having recorded thereon a program for implementing the method of video interprediction encoding/decoding.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Figure 1A:
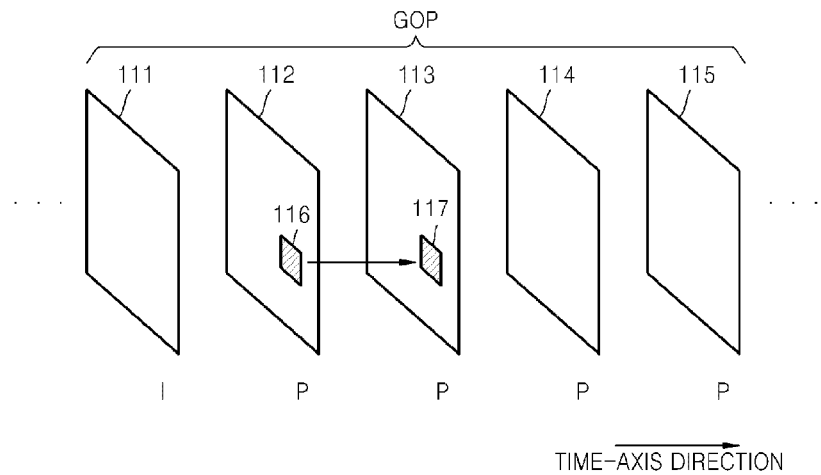
FIGS. 1A through 1C illustrate interprediction according to the related art.
Figure 1B:
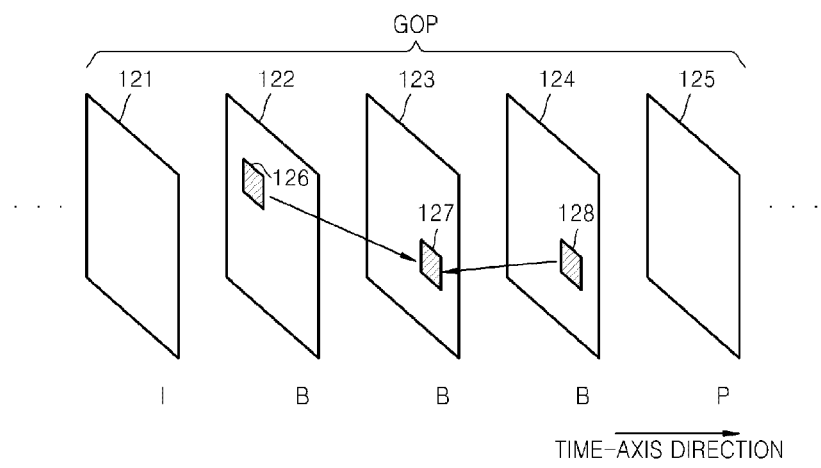

Hereinafter, exemplary embodiments of the present invention will be described in detail with reference to the accompanying drawings. It should be noticed that like reference numerals refer to like elements illustrated in one or more of the drawings. In the following description of the present invention, a detailed description of known functions and configurations incorporated herein will be omitted for conciseness and clarity.

Figure 2:
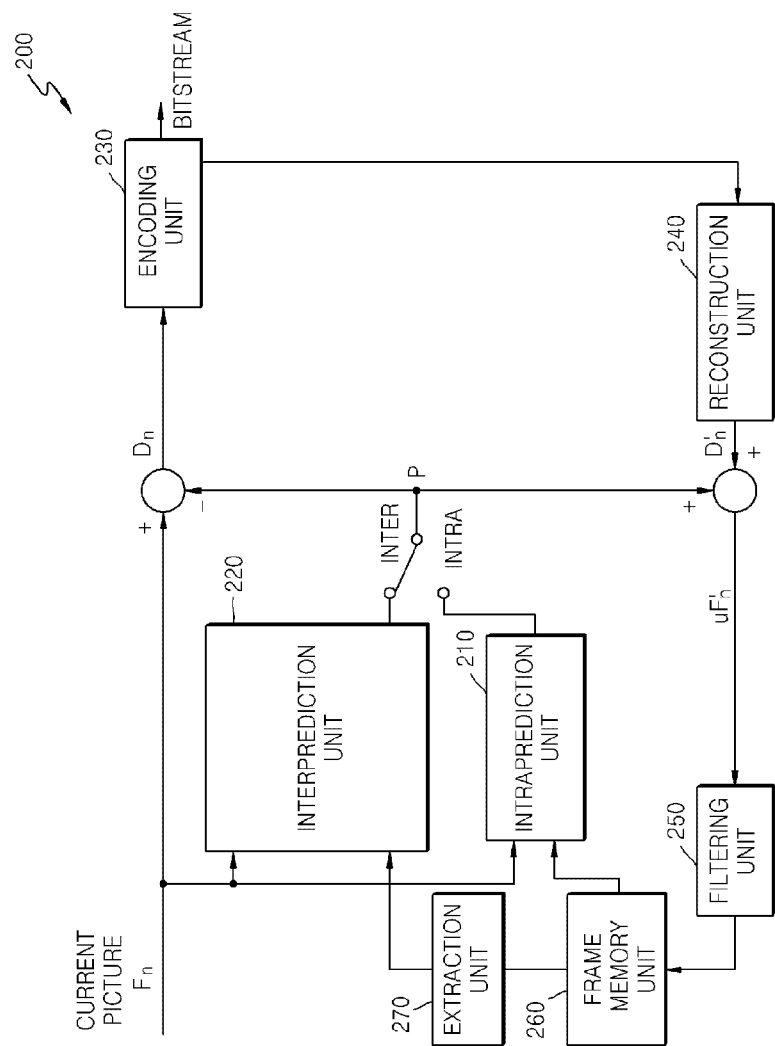
FIG. 2 is a schematic block diagram of a video encoder according to an exemplary embodiment of the present invention.

FIG. 2 is a schematic block diagram of a video encoder 200 according to an exemplary embodiment of the present invention.

Referring to FIG. 2, the video encoder 200 includes an intraprediction unit 210, an interprediction unit 220, an encoding unit 230, a reconstruction unit 240, a filtering unit 250, a frame memory unit 260, and an extraction unit 270. The interprediction unit 220, the extraction unit 270, and the encoding unit 230 constitute an apparatus for interprediction encoding according to an exemplary embodiment of the present invention.

The intraprediction unit 210 performs intraprediction by generating a prediction value of a current block using pixel values of a current picture. The intraprediction with respect to the current block is performed using pixel values of pixels included in a previously encoded region of the current picture. Blocks included in the previously encoded region of the current picture are stored in the frame memory unit 260. The intraprediction unit 210 performs intraprediction using the stored blocks.

The interprediction unit 220 performs interprediction by generating a prediction value of the current block using a reference picture (or reference pictures). According to the H.264 standard, the interprediction unit 220 may search in a predetermined range of the reference picture(s) for a block that is similar to the current block using a sum of absolute differences (SAD) or the like, and use the found similar block as the prediction value of the current block.

However, according to an exemplary embodiment of the present invention, the interprediction unit 220 provides a new interprediction mode in which the prediction value of the current block is searched for only in blocks that have been encoded based on intraprediction in previously encoded pictures.

Once the extraction unit 270 extracts the blocks that have been encoded based on intraprediction in pictures that have been encoded prior to the current picture stored in the frame memory unit 260, the interprediction unit 220 generates the prediction value of the current block by searching the extracted blocks. Since all blocks in an I picture are encoded based on intraprediction, the blocks extracted by the extraction unit 270 also include the blocks of the I picture.

Preferably, the extraction unit 270 extracts the blocks that have been encoded based on intraprediction from previously encoded pictures among pictures included in a GOP and the interprediction unit 220 performs interprediction using the extracted blocks.

The extraction unit 270 may be configured to extract a plurality of blocks, i.e., N blocks, having low compression rates of encoding, when it extracts blocks that have been encoded based on intraprediction from the frame memory unit 260, as will be described later in detail with reference to FIG. 4.

Since interprediction with respect to the current block of the current picture is performed using only blocks that have been encoded based on intraprediction instead of all blocks included in previously encoded pictures, the current block that has been encoded based on interprediction according to an exemplary embodiment of the present invention can be predicted and decoded by extracting only blocks that have been encoded based on intraprediction, as will now be described in detail with reference to FIG. 3.

Figure 3:
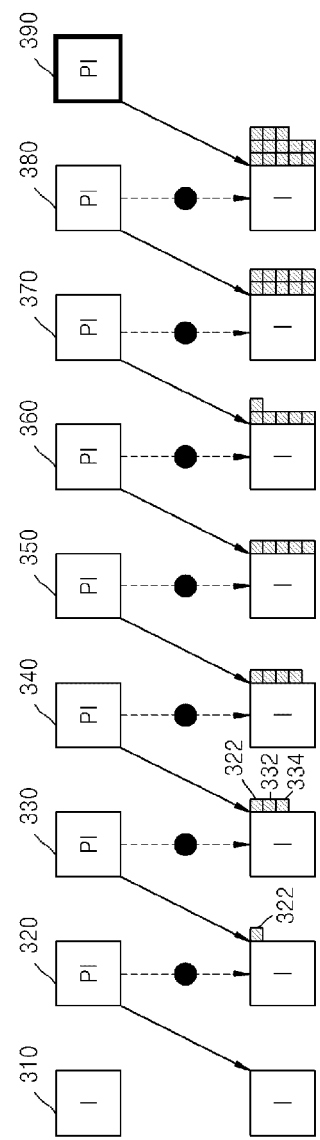
FIG. 3 illustrates interprediction according to an exemplary embodiment of the present invention.

FIG. 3 illustrates interprediction according to an exemplary embodiment of the present invention.

Referring to FIG. 3, the interprediction unit 220 according to an exemplary embodiment of the present invention performs interprediction using an I picture 310 and intraprediction-encoded blocks included in pictures 320 through 380 that have been encoded prior to a current picture 390. The intraprediction-encoded pictures according to the present exemplary embodiment will be defined as predictive intra (PI) pictures.

By predicting and encoding the current block included in the current picture 390 by directly using the intraprediction-encoded I picture 310, the speed of interprediction can be improved. Moreover, since the current block can also be predicted based on newly appearing image objects in the pictures 320 through 380 of a GOP, correlation with pictures that are adjacent to the current picture 390 can also be used. Blocks corresponding to the image objects that do not exist in the I picture 310 and newly appear in the pictures 320 through 380 of the GOP are likely to be encoded based on intraprediction. Thus, only the blocks that have been encoded based on intraprediction from among blocks included in previously encoded pictures are separately extracted in order to be used to predict the current block.

More specifically, referring to FIG. 3, the PI picture 320 that immediately follows the I picture 310 is interpredicted using the I picture 310 as a reference picture. If there is a block that has been encoded based on intraprediction during encoding of the PI picture 320, the next PI picture 330 is interpredicted based on the I picture 310 and an intraprediction-encoded block of the previous PI picture 320. In FIG. 3, since there is a single intraprediction-encoded block 322 in the previous PI picture 320, the next PI picture 330 is interpredicted based on the I picture and the block 322.

Next, the next PI picture 340 is interpredicted using the I picture 310 and intraprediction-encoded blocks 322, 332, and 334 included in the previous PI pictures 320 and 330. The last picture of the GOP is interpredicted using the I picture and intraprediction-encoded blocks included in the other PI pictures of the GOP by repeating interprediction based on the I picture and the intraprediction-encoded blocks included in the previously encoded PI pictures.

Figure 4:
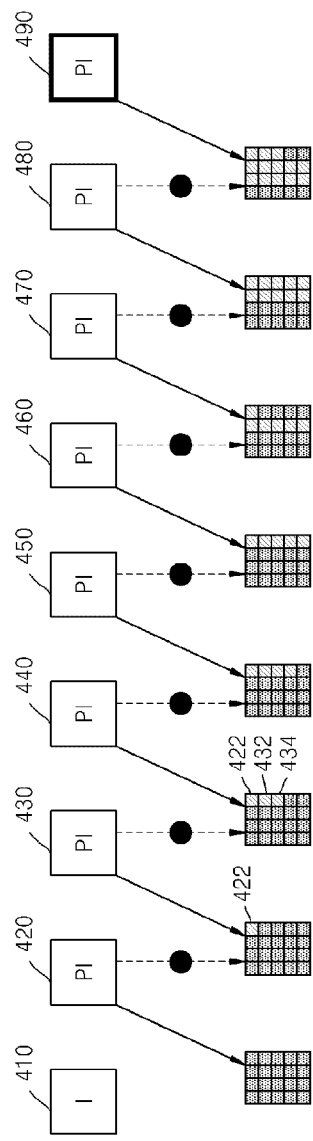
FIG. 4 illustrates interprediction according to another exemplary embodiment of the present invention.

FIG. 4 illustrates interprediction according to another exemplary embodiment of the present invention.

As mentioned above, only N blocks having low compression rates of encoding are extracted in order to be used to predict the current block. N blocks having low compression rates of encoding are extracted during encoding of the first picture of a GOP, i.e., an I picture 410, and the next PI picture 420 is encoded using the extracted N blocks. If there are blocks having lower compression rates than the previously extracted N blocks during the encoding of the next PI picture 420, the blocks are substituted for the previously extracted N blocks. The substituted N blocks are then used to encode the next PI picture 430.

In FIG. 4, it is assumed that, as a result of encoding with respect to the next PI picture 420, a single block 422 has a lower compression rate than the blocks that are extracted as a result of encoding with respect to the I picture 410. Among the N blocks that are previously extracted as a result of encoding with respect to the I picture 410, a block having the highest compression rate is substituted with the block 422 having a low compression rate. The next PI picture 430 is interpredicted based on the N blocks, one of which is substituted with the block 422 of the previous PI picture 420.

If blocks 432 and 434 having lower compression rates than the N blocks are generated as a result of encoding with respect to the next PI picture 430, two blocks having high compression rates from among the N blocks are substituted with the blocks 432 and 434 of the PI picture 430. By repeating such a process up to the last picture of the GOP, only the N blocks having low compression rates of encoding can be searched from among blocks included in previously encoded pictures during prediction with respect to each PI picture. By performing interprediction using the I picture 410 and blocks having low compression rates, which are included in the previous PI pictures 420 through 480, instead of all the interprediction-encoded blocks included in the previous PI pictures 420 through 480, the interprediction can be performed at higher speed.

Referring back to FIG. 2, once the prediction value of the current block is generated as a result of interprediction, as illustrated in FIG. 3 or 4, being performed by the interprediction unit 220, the residue is generated by subtracting the prediction value from the current block. The encoding unit 230 orthogonally transforms the generated residue into a frequency domain and then quantizes and entropy-encodes the transformed residue, in order to insert the resulting residue into a bitstream.

The orthogonally transformed and then quantized residue is inversely quantized and inversely transformed by the reconstruction unit 240 for reconstruction. The reconstructed residue is added to the prediction value and the resulting value is stored in the frame memory unit 260 in order to be used to predict the next block or the next picture. At this time, the resulting value is stored in the frame memory 260 after undergoing deblocking in the filtering unit 250 for removing blocking artifacts.

Figure 5:
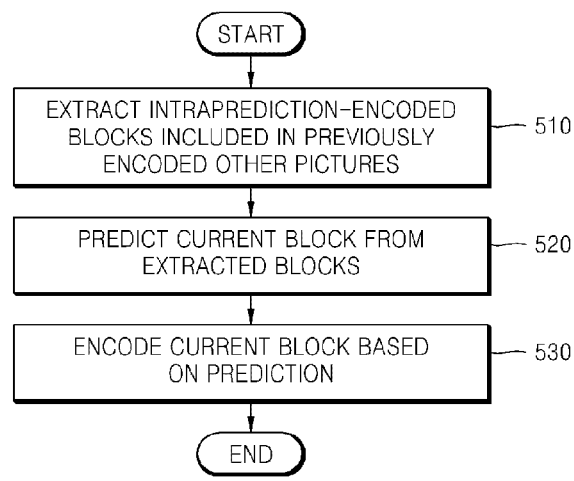
FIG. 5 is a flowchart of a method of video interprediction encoding according to an exemplary embodiment of the present invention.

FIG. 5 is a flowchart of a method of video interprediction encoding according to an exemplary embodiment of the present invention.

Referring to FIG. 5, in operation 510, the apparatus for interprediction encoding according to the present exemplary embodiment extracts blocks that have been encoded based on intraprediction from among blocks included in other pictures that have been encoded prior to the current picture.

In other words, intraprediction-encoded blocks included in the other pictures of a GOP, which have been encoded prior to the current block of the GOP, are extracted. Since all the blocks included in an I picture are encoded based on intra-prediction, only the blocks included in the I picture and intraprediction-encoded blocks included in the other PI pictures of a GOP are extracted.

Preferably, only N blocks having low compression rates of encoding are extracted. More specifically, during encoding with respect to each picture, only N blocks having sequentially low compression rates of encoding are extracted so as to be used for interprediction with respect to the current picture.

In operation 520, the apparatus for interprediction encoding according to the present exemplary embodiment predicts the current block from the blocks extracted in operation 510.

The current block of the current picture is interpredicted by searching only the blocks extracted in operation 510, i.e., the blocks included in the I picture and the intraprediction-encoded pictures included in the previously encoded pictures.

Since the current block is interpredicted by directly using the I picture of the GOP instead of the other P pictures of the GOP, the speed of interprediction can be increased. Moreover, since the interprediction-encoded blocks of the other PI pictures of the GOP are also used for interprediction, correlation with the other pictures, except for the I picture, can also be used.

In operation 530, the apparatus for interprediction encoding according to the present exemplary embodiment encodes the current block based on a prediction value of the current block, which is generated as a result of the interprediction of operation 520.

A residue corresponding to the current block is generated by subtracting the prediction value of the current block from the current block, and the generated residue is orthogonally transformed into frequency components and then quantized. The quantized residue is entropy-encoded and then inserted into a bitstream.

Figure 6:
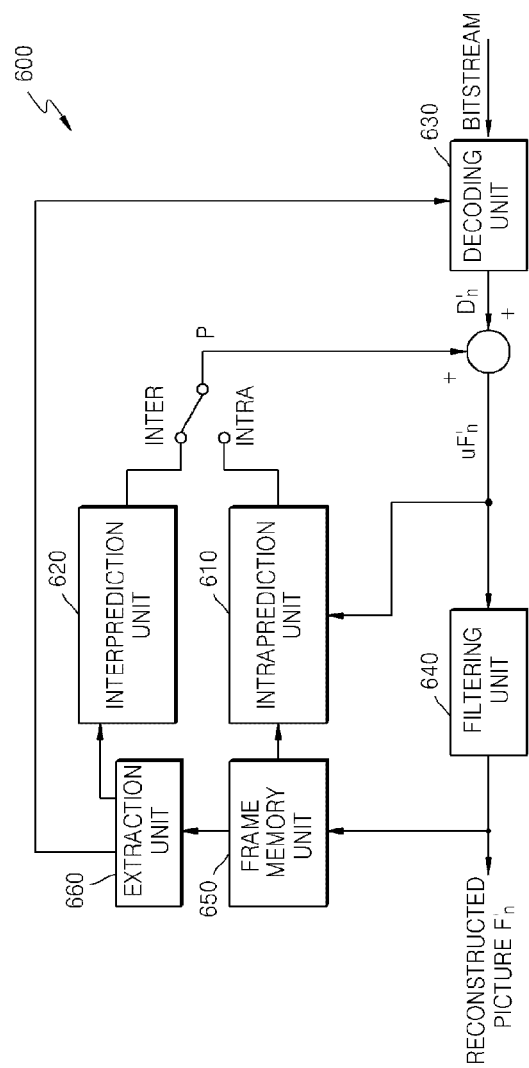
FIG. 6 is a schematic block diagram of a video decoder according to an exemplary embodiment of the present invention.

FIG. 6 is a schematic block diagram of a video decoder 600 according to an exemplary embodiment of the present invention.

Referring to FIG. 6, the video decoder 600 includes an intraprediction unit 610, an interprediction unit 620, a decoding unit 630, a filtering unit 640, a frame memory 650, and an extraction unit 660. The interprediction unit 620 and the extraction unit 660 constitute an apparatus for interprediction decoding according to the present invention.

The intraprediction unit 610 performs intraprediction by generating a prediction value of the current block using pixel values of pixels included in the current picture. The intraprediction unit 610 performs intraprediction on the current block using pixel values of pixels included in a previously decoded region of the current picture.

Blocks included in the previously decoded region of the current picture are stored in the frame memory unit 650 and the intraprediction unit 610 performs intraprediction by referring to the stored blocks.

The interprediction unit 620 performs interprediction by generating the prediction value of the current block using a reference picture or reference pictures. According to the H.264 standard, the interprediction unit 620 may search in a predetermined range of the reference picture(s) for a block that is similar to the current block, and use the found similar block as the prediction value of the current block.

However, according to the present exemplary embodiment, the interprediction unit 620 provides a new interprediction mode in which the prediction value of the current block is searched for only in blocks that have been decoded based on intraprediction in previously decoded pictures.

Once the extraction unit 660 extracts the blocks that have been decoded based on intraprediction in pictures that have been decoded prior to the current picture stored in the frame memory unit 650, the interprediction unit 620 generates the prediction value of the current block by searching the extracted blocks. Since all blocks in an I picture are decoded based on intraprediction, the blocks extracted by the extraction unit 660 also include the blocks of the I picture.

Preferably, the extraction unit 660 extracts the blocks that have been decoded based on intraprediction from previously decoded pictures among pictures included in a GOP and the interprediction unit 620 performs interprediction using the extracted blocks.

The extraction unit 660 may be configured to extract a plurality of blocks, i.e., N blocks having low compression rates of encoding, when it extracts blocks that have been decoded based on intraprediction from the frame memory unit 650.

Figure 1C:
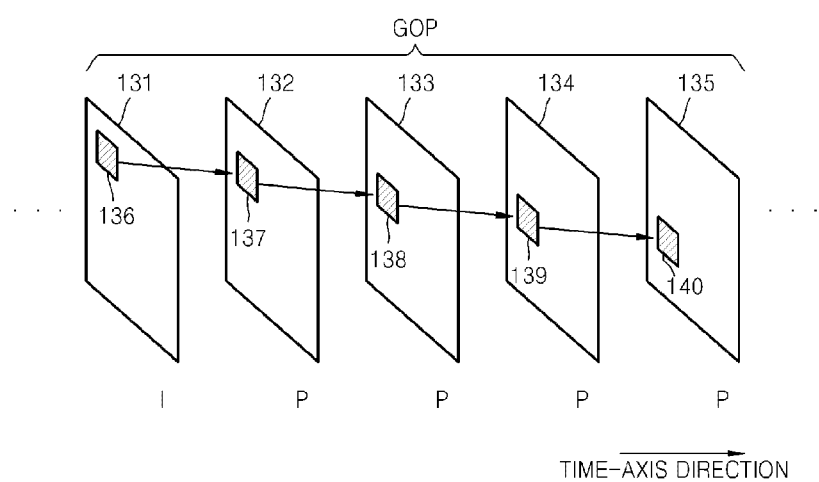

The extraction unit 660 also controls the decoding unit 630 to decode only blocks used for interprediction with respect to the current block. When a user randomly accesses the last picture of a GOP as illustrated in FIG. 1C, the current block of the current picture 135 can be decoded only after all pictures 131 through 134 that have been encoded prior to the current picture 135 are decoded according to the prior art.

However, according to an exemplary embodiment of the present invention, the extraction unit 660 extracts only blocks used for interprediction with respect to the current block from among data included in a bitstream, so as to control the decoding unit 630 to decode the extracted blocks. The intraprediction-encoded blocks of pictures that have to be decoded prior to the current picture are decoded and used for interprediction with respect to the current block, thereby improving the speed of decoding.

Preferably, pictures that are referred to by the current block are specified based on information about reference pictures, included in a header portion of data about the current block, and only intraprediction-encoded blocks included in the specified pictures are decoded and used for interprediction with respect to the current block, thereby further improving the speed of decoding.

The decoding unit 630 extracts data about the current block, included in the bitstream, i.e., data about the residue corresponding to the current block, and performs entropy-decoding, inverse quantization, and inverse transformation on the extracted data, thereby reconstructing the residue. As mentioned above, the decoding unit 630 may also extract and decode only blocks used for interprediction with respect to the current block under the control of the extraction unit 660.

The reconstructed residue is added to the prediction value of the current block, obtained by the intraprediction unit 610 or the interprediction unit 620, thereby reconstructing the current block. The reconstructed current block undergoes deblocking in the filtering unit 640 in order to remove blocking artifacts. The deblocked block is stored in the frame memory unit 650 in order to be used for prediction with respect to the next block or the next picture.

Figure 7:
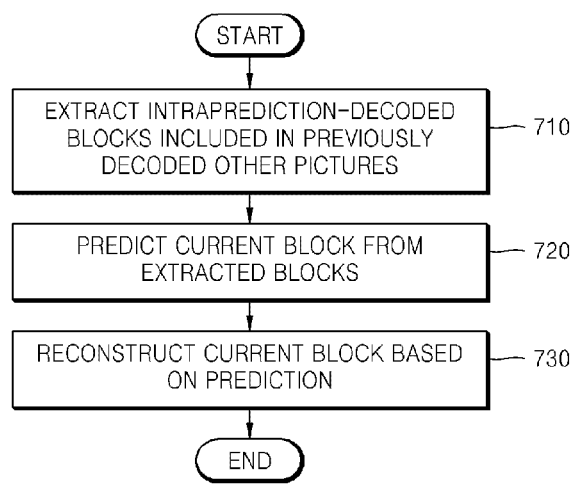
FIG. 7 is a flowchart of a method of video interprediction decoding according to an exemplary embodiment of the present invention.

FIG. 7 is a flowchart of a method of video interprediction decoding according to an exemplary embodiment of the present invention.

Referring to FIG. 7, in operation 710, the apparatus for interprediction decoding according to the present exemplary embodiment extracts intraprediction-decoding blocks included in other pictures that have been decoded prior to the current picture.

In other words, intraprediction-decoded blocks included in the other pictures of a GOP, which have been decoded prior to the current picture of the GOP, are extracted. Preferably, only N blocks having low compression rates of encoding are extracted.

In operation 720, the apparatus for interprediction decoding generates a prediction value of the current block from the blocks extracted in operation 710. In operation 710, a block that is similar to the current block is searched for in the extracted blocks and the found similar block is used as the prediction value of the current block.

The current block of the current picture is interpredicted by searching only the blocks extracted in operation 710, i.e., blocks included in the I picture and intraprediction-decoded blocks included in previously decoded pictures.

In operation 730, the apparatus for interprediction decoding reconstructs the current block based on the prediction value of the current block, which is generated as a result of the interprediction of operation 720. In other words, the current block is reconstructed by adding the prediction value of the current block to the reconstructed residue.

The terms such as the I picture, the P picture, the B picture, and the PI picture used herein are used only for convenience of explanation. Thus, those of ordinary skill in the art can easily understand that the present invention can also be applied to a slice instead of a picture, i.e., an I slice, a P slice, a B slice, and a PI slice.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, according to exemplary embodiments of the present invention, the current block is interpredicted by directly using an I picture, thereby increasing the speed of interprediction encoding/decoding.

Moreover, encoding/decoding can be performed using not only an I picture of a GOP but also correlation between adjacent pictures, thereby improving the compression rate of video encoding.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of video interprediction encoding, the method comprising:
   intraprediction-encoding blocks of pictures included in a group of pictures (GOP),
   wherein the GOP includes an intra (I) picture;
   extracting N blocks from among the intraprediction-encoded blocks, included in one or more previously encoded pictures that follow the I picture;
   interprediction encoding a current block based only on the extracted N blocks which have been encoded based on the intra prediction and on the I picture; and
   encoding the current block based on the output of the interprediction,
   wherein each of the extracted N blocks is a block of one of subsequent pictures that follow the I-picture and is different from a corresponding block of the I-picture.

2. The method of claim 1, wherein the extracting of the N blocks comprises extracting only blocks having low compression rates of encoding.

3. The method of claim 1, further comprising:
   receiving a stream of encoded PI pictures; and
   decoding the encoded PI pictures.

4. An apparatus for video interprediction encoding, the apparatus comprising:
   an intraprediction unit which performs intraprediction on blocks of pictures included in a group of pictures (GOP), wherein the GOP includes an intra (I) picture;
   an extraction unit which extracts N blocks from among the intraprediction-encoded blocks, included in one or more previously encoded pictures that follow the I picture;
   an interprediction unit which performs interprediction based only on the extracted N blocks and on the I picture; and
   an encoding unit which encodes a current block based on an output of the interprediction unit,
   wherein each of the extracted N blocks is a block of one of subsequent pictures that follow the I-picture and is different from a corresponding block of the I-picture.

5. A method of video interprediction decoding, the method comprising:
   performing intraprediction on a current block using pixel values of a previously decoded region of a current picture;
   extracting N blocks from among intraprediction-decoded blocks, included in one or more of previously decoded pictures that follow an I-picture;
   performing interprediction based only on the extracted N blocks which have been decoded based on the intraprediction, and on the I-picture;
   decoding the current block based on the output of the interprediction; and reconstructing the current block based on the output of the decoding,
   wherein the decoding comprises performing interprediction decoding of a current predictive (PI) picture from the extracted N blocks,
   wherein each of the extracted N blocks is a block of one of subsequent pictures that follow the I-picture and is different from a corresponding block of the I-picture.

6. The method of claim 5, wherein the extracting comprises extracting only the blocks of previous pictures that have been used for interprediction encoding of the current block, prior to the decoding; and
   the decoding further comprises decoding only intraprediction-encoded blocks of the previous pictures that have been used for the interprediction encoding of the current block.

7. An apparatus for video interprediction decoding, the apparatus comprising:
   an intraprediction unit which performs intraprediction on a current block using pixel values of a previously decoded region of a current picture;
   an extraction unit which extracts N blocks from among intraprediction-decoded blocks, included in one or more of previously decoded pictures that follow an I-picture;
   an interprediction unit which performs interprediction based only on the N extracted blocks which have been decoded based on the intraprediction and on the I-picture;
   a decoding unit which decodes the current block based on an output of the interprediction unit; and
   a reconstruction unit which reconstructs the current block based on an output of the decoding unit, wherein the extraction unit extracts the N blocks and the decoding unit performs interprediction decoding of a current predictive (PI) picture from the extracted N blocks, and
   each of the extracted N blocks is a block of one of subsequent pictures that follow the I-picture and is different from a corresponding block of the I-picture.

8. A non-transitory computer-readable recording medium having recorded thereon a program for video interprediction encoding, the method comprising:
   intraprediction-encoding blocks of pictures included in a group of pictures (GOP),
   wherein the GOP includes an intra (I) picture;
   extracting N blocks from among the intraprediction-encoded blocks, included in one or more previously encoded pictures that follow the I picture;
   interprediction encoding a current block based only on the extracted N blocks which have been encoded based on the intraprediction and on the I-picture; and
   encoding the current block based on the output of the interprediction,
   wherein each of the extracted N blocks is a block of one of subsequent pictures that follow the I-picture and is different from a corresponding block of the I-picture.

9. A non-transitory computer-readable recording medium having recorded thereon a program for video interprediction decoding, the method comprising:

performing intraprediction on a current block using pixel values of a previously decoded region of a current picture;

extracting N blocks from among intraprediction-decoded blocks, included in one or more of previously decoded pictures that follow an I-picture;

performing interprediction based on only the N extracted blocks which have been decoded based on the intraprediction and on the I-picture;

decoding the current block based on the output of the interprediction; and reconstructing the current block based on the output of the decoding, wherein the decoding comprises performing interprediction decoding of a current predictive (PI) picture from the extracted N blocks, and each of the extracted N blocks is a block of one of subsequent pictures that follow the I-picture and is different from a corresponding block of the I-picture.

* * * * *